United States Patent [19]
Andrejasich et al.

[11] 4,442,405
[45] Apr. 10, 1984

[54] FLOAT ASSEMBLY FOR A SENSOR

[75] Inventors: Raymond J. Andrejasich, Carmel; Ralph A. Perry, Indianapolis, both of Ind.

[73] Assignee: Emhart Industries, Inc., Indianapolis, Ind.

[21] Appl. No.: 373,850

[22] Filed: May 3, 1982

[51] Int. Cl.³ .............................................. G01N 27/02
[52] U.S. Cl. ....................................... 324/439; 73/308; 73/DIG. 5; 73/313; 324/207; 335/219
[58] Field of Search .................. 324/439, 207; 73/308, 73/313, DIG. 5; 200/61.2; 335/219

[56] References Cited

U.S. PATENT DOCUMENTS

| | | | |
|---|---|---|---|
| 3,974,695 | 8/1976 | Lerner | 73/313 |
| 3,992,941 | 11/1976 | McGoldrick | 73/DIG. 5 |
| 4,175,435 | 11/1979 | Hara | 73/DIG. 5 |

*Primary Examiner*—Michael J. Lynch
*Assistant Examiner*—Kevin D. O'Shea
*Attorney, Agent, or Firm*—Robert F. Meyer

[57] ABSTRACT

A float assembly for a sensor provides a float member having a channel passing therethrough, a mounting for the sensor on the float, a guide passing through the channel for guiding the movement of the float member, a stop including a magnet located on the guide for limiting the movement of the float, and a magnetically activated switch included in the float member for activating when in proximity to the stop magnet for indicating that the float member is in proximity to the stop.

10 Claims, 2 Drawing Figures

FIG.1
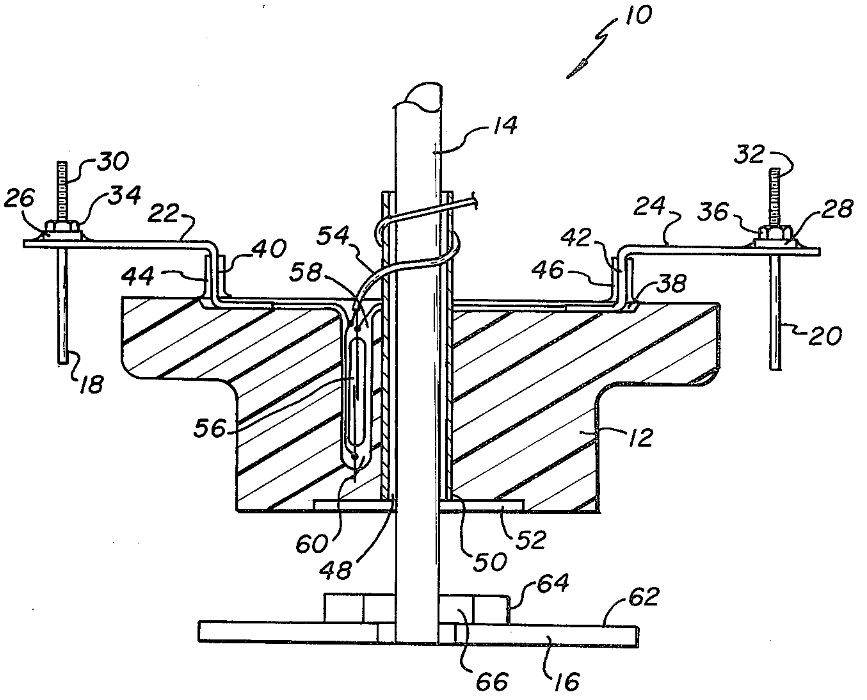
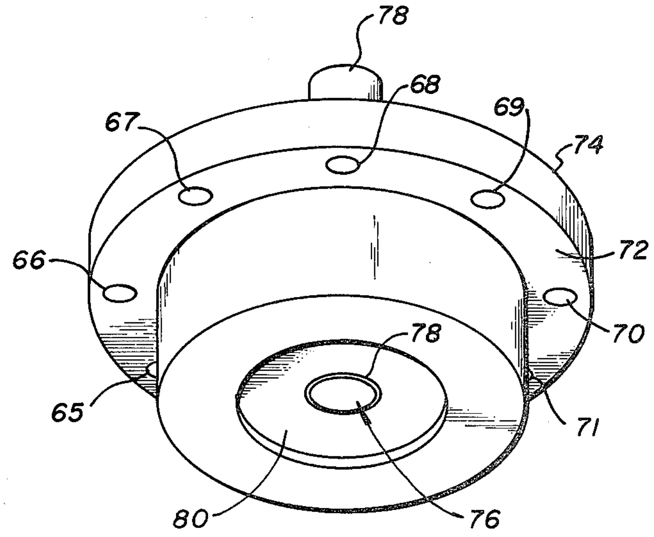
FIG.2

FLOAT ASSEMBLY FOR A SENSOR

BACKGROUND OF THE DISCLOSURE

1. Field of the Invention

The present invention generally relates to sensor carrying floats and, in particular to such floats which have only a limited freedom of movement.

2. Statement of the Prior Art

Instruments and sensors for the detection of underground hydrocarbon contamination have become increasingly popular over recent years due to increased awareness of such environmental pollution. Due to the fact that hydrocarbon liquids have a lower density than water and are, therefore, found at the surface of water, many of the hydrocarbon sensors developed employ a floatation device to maintain a sensor in proximity to the surface of water. Such devices have been adapted for use in oceans, lakes and ground water well shafts. One of the sensors which has been employed with these floatation devices is an electrical conductivity sensor which discriminates between water and hydrocarbon liquids based on the conductivity thereof. Unfortunately, a problem may occur with such sensor and other floatation type sensors, which problem causes a false hydrocarbon liquid signal to be generated when the water level maintaining the device drops to a point where the device is no longer floating. This is due to the fact that the electrical conductivity of air along with the electrical conductivity of hydrocarbon liquids are both less than that of water. Thus, when the water level drops and the device is no longer floating, the electrodes used to measure conductivity are usually exposed to air and, therefore, the conductivity therebetween decreases. This usually causes the instrument to falsely indicate that hydrocarbons are present.

SUMMARY OF THE INVENTION

Accordingly, a float assembly for a sensor has been developed which prevents false signals from being generated when the water level drops to a point where the sensor is no longer floating at the surface of the water. The present invention includes a float assembly for a sensor comprising a float member having a channel means passing therethrough, means for mounting a sensor on the float, guide means passing through the channel means for guiding the movement of the float member, stop means located on the guide means for limiting the movement of the float means, the stop means including a magnet, and magnetically activated switch means included in the float member for activating when in proximity to the stop means magnet for indicating that the float member is in proximity to the stop means.

BRIEF DESCRIPTION OF THE DRAWINGS

The present invention is illustratively described in respect to the appended drawings in which:

FIG. 1 is a partially sectioned side view of a float assembly for a sensor constructed in accordance with one embodiment of the present invention; and FIG. 2 is a perspective view a variation of a portion of the embodiment of FIG. 1.

DETAILED DESCRIPTION OF THE DRAWINGS

A float assembly 10 for a sensor generally includes a float member 12, a guide means 14 and a stop means 16. A sensor mounted on the float member 12 generally includes a pair of electrodes 18 and 20 for allowing measurement of the electrical conductivity therebetween.

The float assembly 10 further includes means for mounting the sensor or electrodes 18 and 20 thereon. The means for mounting include a pair of members 22 and 24, each mounting a separate one of the electrodes 18 and 20, respectively. The members 22 and 24 are fabricated from a pair of elongated, flat-plate electrical conductors. The electrodes 18 and 20 are mounted near one end of their respective members 22 and 24 by any suitable means which forms electrical contact. In the present embodiment, a threaded nut 26 and 28 is affixed by any suitable method, such as welding, to one end of each member 22 and 24. The electrodes 18 and 20 each has a threaded end 30 and 32, respectively, which is engaged with the nuts 26 and 28. Also, the nuts 26 and 28 are mounted over holes (not shown) in the flat-plate members 22 and 24 for allowing the electrodes 18 and 20, respectively, to pass therethrough. A pair of lock nuts 34 and 36 are then threaded onto the electrodes 18 and 20 for securing the electrodes from becoming loose and also for allowing adjustment of the vertical position of the electrodes to allow measurement for hydrocarbon liquids to different depths. The other ends of each of the members 22 and 24 are secured by suitable means to the float member 12. In the present case, an epoxy resin is used which fills a cavity 38 located on the top portion of the float member 12. The members 22 and 24 also each has substantially vertical portion 40 and 42, respectively, thereof which extends upwardly from the top of the float member 12. These vertical portions are encased in an electrical insulating material 44 and 46, respectively, to prevent false electrical conductance readings from being generated by water droplets located on the top side of the float member 12.

The float member 12 further includes a central channel means 48. Located within the channel means 48 is a cylindrical insert 50. In the present embodiment, the float member 12 is made from a closed cell, foamed neoprene rubber known generically as nitrile, and available under the tradename NITROPHYL from the Rogers Corporation of Williamantic, Conn. Nitrile is resistant to decay caused by hydrocarbon substances. The cylindrical insert 50 is made from a standard size of nylon tubing. The cylindrical insert 50 extends from approximately 1" above the top of float member 12 to the surface of a cavity 52 located at the bottom of the float member 12. Cavity 52 is generally annular in shape and concentric with the bottom end of channel means 48.

The sensor float assembly further includes an electrical cable 54 having a pair of insulated conductors. One conductor is connected to the electrode 18 via member 22 and the other conductor is connected to electrode 20 via member 24. Also connected across the conductors of cable 54 is a magnetically activated switch means 56 which is a common magnetic reed switch. Switch means 56 is located in an elongated cavity 58 in float member 12. The elongated cavity 58 is generally cylindrical in shape and open at the top. The bottom end 60 thereof extends in proximity to the top surface of cavity 52. The cavity 58 is further oriented generally parallel to the channel 48 and is offset therefrom.

The remainder of float assembly 10 includes the guide means 14 and the stop means 16. Guide means 14 generally includes a rod which is intended for vertical orientation to guide the float member 12 in a vertical direction as it responds to the rising and lowering of the water level. Attached to the lower end of guide means 14 is the stop means 16. The stop means 16 generally includes a circular plate 62 and an annularly shaped permanent magnet 64. The plate 62 is affixed to the bottom end of guide means 14 by means of a bushing 66, although any suitable means of attachment would be satisfactory. As mentioned, the permanent magnet 64 is annular in shape and is concentrically located about the rod or guide means 14 by the bushing 66. The size of magnet 64 is slightly smaller than the size of the cavity 52 formed in the bottom of float member 12. This enables the magnet 64 to protrude into the cavity 52 when the float member 12 reaches the bottom limit of its vertical travel. This enables the float member 12 to be maintained in a relatively fixed position with respect to the magnet 64 when the float member 12 is not being supported by liquid presence. As shown in FIG. 1, the float member 12 is relatively free to rotate around the guide means 14. The use of an annularly shaped magnet which is concentric around guide means 14 insures proper activation of switch means 56 regardless of the angular position thereof around the guide means 14.

FIG. 2 shows a slightly different version of the embodiment of FIG. 1. In FIG. 2 the electrodes 18 and 20 are replaced by a plurality of small electrodes or contacts 65 through 71. These electrodes 65–71 protrude from a downwardly facing surface 72 of a float member 74 which is similar to float member 12. Float member 74 includes a channel means 76 which is identical to the channel means 48 of float member 12. Located within channel means 76 is a cylindrical insert 78 identical to the insert 50 of float member 12. Also, located on the bottom of float member 74 is a cavity 80 identical to the cavity 52 of FIG. 1 which shows the annular shape thereof. The extra number of electrical contacts 65 through 71 are connected to a pair of electrical conductors as in FIG. 1 with alternating electrodes being connected to alternating conductors. This arrangement presents several parallel sensor pairs and thus prevents false alarming due to nutation of the float in a turbulent liquid environment, as all the sensor pairs must be displaced from the water medium to give a detection. Nutation of the float is possible because the diameter of guide means 14 is substantially smaller than the inner diameter of the cylindrical inserts 78 and 50 for the purpose of allowing float members 12 and 74 greater freedom of movement. The multiple sensor pairs formed by contacts 65 to 71 also allow more accurate readings at lower conductivity levels. The float member 74 is shown separate from any float assembly including a guide means or stop means; however, it may be freely interchanted with the float means 12 of FIG. 1. A magnetic reed switch is included in float member 74 in an identical manner to float member 12.

Thus constructed, the float assembly 10 operates to determine the conductivity between electrodes 18 and 20 of the liquid in which it is floating. The depth to which the conductivity is measured is determined by the downward extension set for electrodes 18 and 20. Thusly, when the electrodes 18 and 20 are in contact with any amount of ground water, the resistance therebetween is relatively low. When a sufficient surface layer of oil develops on top of the water and the float member 12 rises with respect thereto to a level where the electrodes 18 and 20 are no longer in contact with water, the conductance therebetween decreases sufficiently to allow a conductance measuring element connected to cable 54 to determine that a change has taken place. As the water level rises and falls, the float means 12 follows these changes and maintains the electrodes 18 and 20 in the same relative position with respect to the surface of the water. When the water level drops sufficiently to allow the float member to contact the stop means 62, the electrodes 18 and 20 will no longer be exposed to water and thus the resistance therebetween will increase dramatically with a corresponding decrease in the conductivity therebetween. As a means of preventing this false indication of hydrocarbon fluid presence, the magnet 64 has come in close proximity to the switch means 56 and thereby causes the switch means 56 to activate and short the conductors of cable 54. This shorting maintains the low resistance between the electrodes 18 and 20 to avoid a high resistance reading as would be afforded by the electrodes 18 and 20 being out of water. This shorting of the conductors of cable 54 may also be sensed by an instrument to determine that the float means 12 is in proximity to the stop means 16. When the water level again rises to a point where it can support the float means above and away from the magnet 64, the switch means 56 opens and allows the electrodes to be functional in determining the electrical conductivity of the supporting liquid.

The present invention is thusly a simple and inexpensive means for preventing false indications of hydrocarbon presence in cases where the float member 12 has reached the limit of its permissible downward travel.

The above descriptions of the embodiments of the present invention are intended to be taken in an illustrative and not in a limiting sense. Various modifications and changes may be made to the above embodiments by persons skilled in the art without departing from the scope of the present invention as defined in the appended claims.

What is claimed is:

1. A float assembly for a sensor, comprising:

a float member having a channel means passing therethrough;

means for mounting a sensor on said float;

guide means passing through said channel means for guiding the movement of said float member;

stop means located on said guide means for limiting the movement of said float means, said stop means including a magnet; and magnetically activated switch means included in said float member for activating when in proximity to said stop means magnet for indicating that said float member is in proximity to said stop means.

2. The float assembly of claim 1, wherein said stop means is located below said float member on said guide means to limit downward movement of said float member and further wherein said activating of said switch indicates that said float member is no longer floating.

3. The float assembly of claim 1, further comprising means for connecting said switch means to said sensor mounted on said float member.

4. The float assembly of claim 3, wherein said sensor includes electric contact mean exposed to the fluid around said float member to measure the electrical conductivity thereof.

5. The float assembly of claim 4, wherein said contact means includes a multiplicity of contact points.

6. The float assembly of claim 1, wherein said channel means is straight and intended for substantially vertical orientation and further wherein said guide means is rod intended for substantially vertical orientation.

7. The float assembly of claim 6, wherein said magnet is planar in shape and located generally perpendicular to and completely around said guide means.

8. The float assembly of claim 7, wherein said switch means is an elongated reed switch having an axis and further wherein said float member includes means for maintaining the axis of said reed switch generally parallel to said rod.

9. The float assembly of claim 8, wherein said float member has freedom to rotate around said rod and said switch means thereby has freedom to change angular location around said rod.

10. The float assembly of claim 1, wherein said means for mounting includes means for adjustably positioning a pair of electrodes at a selectable height with respect to said float member.

* * * * *